Oct. 26, 1926.
L. H. BACHER, JR
1,604,627
ANTIRATTLING CONSTRUCTION FOR WINDOWS
Filed Oct. 16, 1924
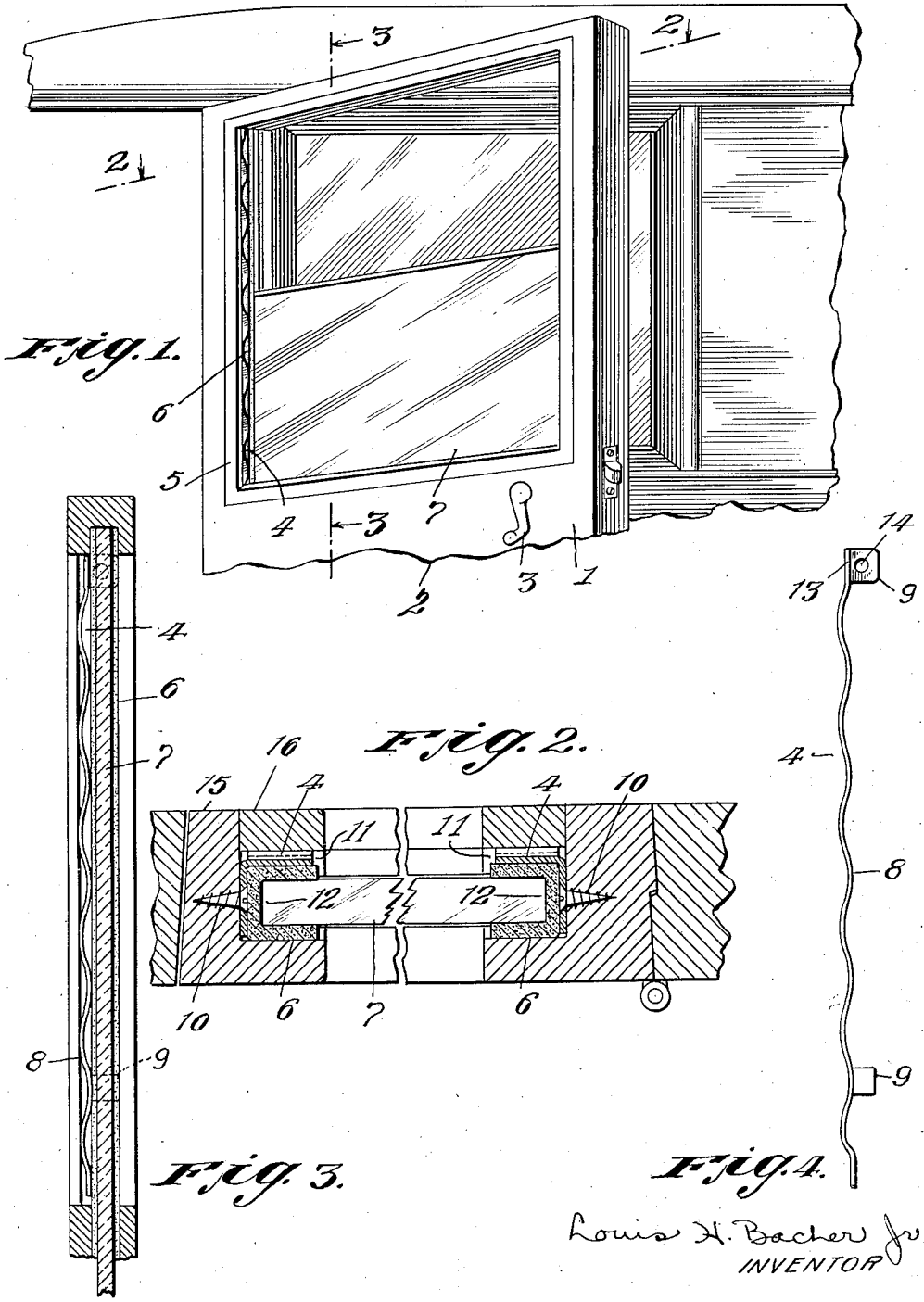
Louis H. Bacher Jr.
INVENTOR
BY Moses and Nolte
his ATTORNEYS Patented Oct. 26, 1926.

1,604,627

UNITED STATES PATENT OFFICE.

LOUIS H. BACHER, JR., OF CLEVELAND, OHIO.

ANTIRATTLING CONSTRUCTION FOR WINDOWS.

Application filed October 16, 1924. Serial No. 743,910.

This invention relates to devices for window frames, more particularly to anti-rattling devices for automobile windows; but it will be understood that the invention is not limited to such use.

As is well known, the type of window used in automobile construction, particularly the adjustable windows, is prone to rattle, due to vibrations from the motor, and to shocks from bumps on and holes in the roads.

The present invention has for its object to provide a means for eliminating the rattling of a window by holding it securely in place. For this purpose the invention contemplates to provide the window with an anti-rattling device consisting of a corrugated metal strip and a piece of soft shock absorbing material like felt, so positioned with respect to the pane of glass that the latter is prevented from vibrating. The construction of the device is such that it may be applied to any vehicle, either during its assembly or after its completion.

A good understanding of the invention may now be had from the following description of a specific form of embodiment thereof, reference being had to the accompanying drawing in which:

Figure 1 is a perspective view of an upper portion of an automobile body with a door open to illustrate an anti-rattling device constructed in accordance with the present invention positioned in the window sash of the said open door;

Figure 2 is a sectional view on the line 2—2 of Fig. 1 looking in the direction of the arrows, the door being shown in its closed position.

Figure 3 is a sectional view on the line 3—3 of Fig. 1 looking in the direction of the arrows; and Figure 4 is a side elevation of the anti-rattling strip.

Similar characters of reference designate similar parts in each view.

The numeral 1 denotes a window frame which is located in the upper portion of a door 2. A pane of glass within the window frame is adjustable and may be moved up or down in grooves 11, 11 by means of a crank handle 3. A piece of felt 6 or the like material is substantially U-shaped in cross section and is positioned within each groove 11 in the window frame. An anti-rattle strip 4 is interposed between the side wall of the groove and the felt, and is fastened therein by means of a screw 10. The said strip is positioned on the inner face of the pane and extends substantially the entire length of the said groove. Due to the fact that the anti-rattle strip is between the groove and the felt, it holds the latter as well as the pane of glass snugly in position. As the felt wears and gets thinner, the anti-rattle strip expands and takes up the wear, thereby keeping a tight fit. It is necessary to maintain this tight fit in order to prevent the window from rattling.

The shape of the anti-rattle strip may be seen from Fig. 4. The strip consists of an elongated portion 8 having corrugations along its face, and attaching ears 9, 9 extending at substantially right angles to the face. One of the said ears is positioned at the upper end of the strip and the other adjacent the lower end. The attaching ear at the upper end of the said strip has a hole 14 in it, so that it may be fastened to the frame 15 of the window. The attaching ear adjacent to the lower end of the strip has a plane face and is adapted to be held in place by the edge of the pane of glass. The lower ear is free to move and take up any movement of the elongated portion of the strip.

If the attachment is to be installed in an assembled automobile, all that is necessary to do is to adjust the pane of glass to its lowermost position, withdraw the piece of felt, and then fasten the anti-rattle strip in the groove of the window frame.

It is to be noted that due to the resilient nature of the anti-rattle strip, it presses against the felt cushion which in turn bears against the pane of glass. In this manner the glass is held in place and prevented from vibrating.

It is also to be observed that any shocks or vibrations transmitted to the window are absorbed by the combination of felt and the corrugated strip, so that all rattling of the pane of glass is eliminated.

Although I have shown and described only a specific form of embodiment of the invention, it will be readily understood that many changes and modifications may be made therein within the scope of the following claims without departing from the spirit and scope of the invention.

What I claim is:

1. In combination with a window frame having vertical grooves, a pane of glass sliding in the grooves of the said frame, a piece of shock absorbing material inserted about each vertical edge of the glass within the said grooves, and an anti-rattling strip comprising a corrugated portion with fastening means for fixing it to the window frame, said strip being inserted between a portion of the said shock absorbing material contiguous to a face of the said pane and a face of the adjacent groove and pressing the shock absorbing material against the pane.

2. In combination with an automobile window frame having grooves, a pane of glass sliding in the grooves of the said frame, a piece of soft material positioned about a sliding edge of the said pane, and an anti-rattling strip comprising a corrugated portion with extending ears, said stripping being inserted between a portion of the said soft material contiguous to a face of the said pane and a face of the adjacent groove for pressing the soft material snugly against the pane.

3. In combination with an automobile window frame having vertical grooves, a sliding pane of glass adjustably positioned in the grooves of the said frame, a piece of felt fixed in the window frame to extend about the edge of a vertical side of the said pane, and an anti-rattling strip comprising a corrugated portion having an extending attaching ear at one end, the said corrugated portion being positioned between a portion of the said felt contiguous to a face of the said pane and a face of the adjacent groove and pressing the felt snugly against the pane.

4. In combination with an automobile window frame having grooves, a sliding pane of glass positioned in the grooves of the said frame, an anti-rattling strip comprising a corrugated portion having an extending ear at one end located in one of the said grooves, the said corrugated portion being positioned to apply pressure to a face of the said pane and prevent the rattling of the latter, and stationary, shock absorbing, anti-friction means inserted between the said pane and the said strip to prevent direct contact of the said strip with the said pane.

5. In combination with a vehicle window frame, a plurality of grooves in the said frame, a pane of glass slidingly positioned in said grooves, a piece of shock absorbing material substantially U-shaped in section inserted in the said grooves, and an anti-rattling strip comprising a corrugated portion and an attaching ear interposed between said shock absorbing material and one of said grooves, the said attaching ear being positioned behind the edge of the pane and the said corrugated portion being positioned so as to exert pressure on a face of said pane.

In testimony whereof I have affixed my signature to this specification.

LOUIS H. BACHER, Jr.